United States Patent
Coleman

(10) Patent No.: US 10,156,472 B2
(45) Date of Patent: Dec. 18, 2018

(54) METHODS AND APPARATUS FOR IMPROVED VIBRATION CANCELLATION IN ACOUSTIC SENSORS

(71) Applicant: RAYTHEON BBN TECHNOLOGIES CORP., Cambridge, MA (US)

(72) Inventor: Ronald Bruce Coleman, Arlington, MA (US)

(73) Assignee: Raytheon BBN Technologies Corp., Cambridge, MA (US)

(*) Notice: Subject to any disclaimer, the term of this patent is extended or adjusted under 35 U.S.C. 154(b) by 704 days.

(21) Appl. No.: 14/532,379

(22) Filed: Nov. 4, 2014

(65) Prior Publication Data
US 2017/0023401 A1    Jan. 26, 2017

(51) Int. Cl.
*G01H 3/00* (2006.01)
*G01H 3/08* (2006.01)
*H04R 3/02* (2006.01)

(52) U.S. Cl.
CPC .......... *G01H 3/005* (2013.01); *G01H 3/08* (2013.01); *H04R 3/02* (2013.01); *H04R 2410/03* (2013.01)

(58) Field of Classification Search
CPC . G01H 3/005; G01H 3/08; H04R 3/02; H04R 2410/03; H04R 3/002
USPC .................................................. 381/94.9, 169
See application file for complete search history.

(56) References Cited

U.S. PATENT DOCUMENTS

| | | | |
|---|---|---|---|
| 3,060,333 A * | 10/1962 | Bradley, Jr. | G01P 15/0907 29/595 |
| 5,157,596 A | 10/1992 | Alcone | |
| 6,275,591 B1 * | 8/2001 | Hsueh | G01H 3/08 381/71.11 |
| 2006/0158329 A1 | 7/2006 | Burkley et al. | |
| 2008/0025728 A1 | 1/2008 | Shpantzer et al. | |
| 2008/0192963 A1 * | 8/2008 | Sato | H04R 19/005 381/174 |

(Continued)

OTHER PUBLICATIONS

Unknown, ICP Dynamic Pressure Sensor Installation and Operating Manuel(Model 106B50), Pressure Division of PCB Piezotronics, Inc., Oct. 3, 2008, 9 Pages.

(Continued)

*Primary Examiner* — Paul S Kim
*Assistant Examiner* — Douglas Suthers
(74) *Attorney, Agent, or Firm* — Lando & Anastasi, LLP

(57) ABSTRACT

Acoustic sensing systems having improved vibration cancelation, and methods of achieving improved vibration cancelation. In one example, an acoustic sensing system includes an acoustic sensor configured to produce a sensor output signal representative of a response of the acoustic sensor to acoustic excitation and vibration excitation, at least one accelerometer configured to provide an acceleration signal responsive to the vibration excitation, and a controller, including an adaptive digital filter, coupled to the acoustic sensor and to the at least one accelerometer, and configured to receive the acceleration signal and to adjust coefficients of the adaptive digital filter so as to minimize coherence between a residual signal and the acceleration signal, the residual signal being a difference between the sensor output signal and a filter output signal from the adaptive digital filter.

11 Claims, 18 Drawing Sheets

(56) References Cited

U.S. PATENT DOCUMENTS

2013/0014586 A1* 1/2013 Walling .............. G01P 15/0907
　　　　　　　　　　　　　　　　　　　　　　　73/514.34

OTHER PUBLICATIONS

Han et al., "Development of real-time motion artifact reduction algorithm for a wearable photoplethysmography", Annual International Conference of the IEEE EMBS, Aug. 23-26, 2007, p. 1538-1541.
Tamura et al., "Wearable Photoplethysmographic Sensors—Past and Present", Electronics, pp. 282-302, 2014.

* cited by examiner

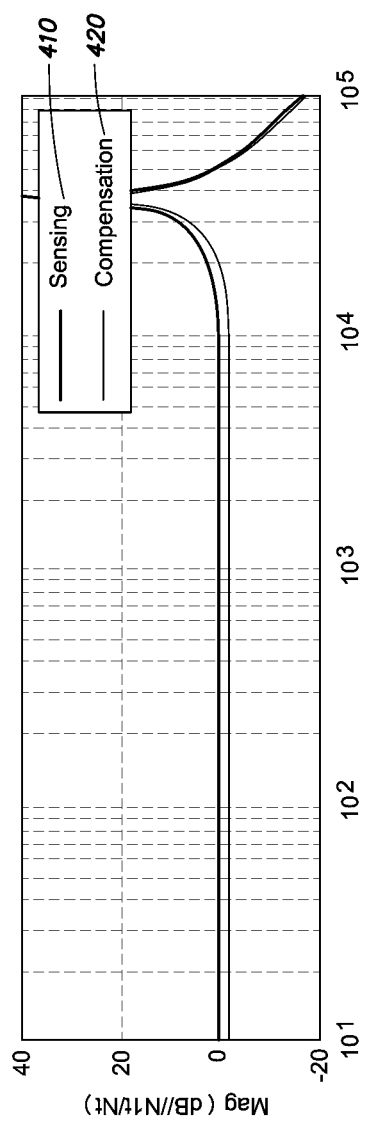
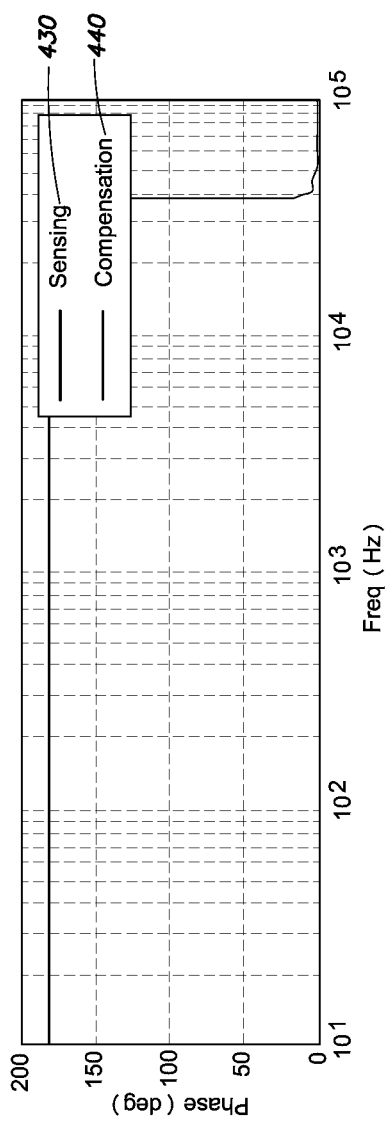
FIG. 4A
FIG. 4B

METHODS AND APPARATUS FOR IMPROVED VIBRATION CANCELLATION IN ACOUSTIC SENSORS

BACKGROUND

Acoustic sensors, such as microphones, used in countershooter and a variety of other applications are typically mounted to moving platforms (e.g., vehicles, helicopters, etc.). The operation of these vehicles produces local vibrations at the microphone mounting locations. These vibrations include both axial motion (in-line with the sensing axis of the microphone) and rocking motions about axes perpendicular to the sensing axis of the microphone. The conventional approach to minimize the vibration response of the microphone includes the use of a second crystal (referred to as a compensation crystal), the electrical response of which is matched to that of the primary sensing crystal in order to cancel the response to axial motion of the transducer. This approach has the advantage of simple implementation (the matched crystals are connected in a back-to-back manner, such that their responses to axial motion are approximately equal and opposite), and provides significant reduction in vibration sensitivity of the microphone over a wide frequency band for axial motion. However, this method requires precise tuning of the masses and crystals used in the microphone to achieve good performance across a wide frequency band, which results in high cost of the devices. In addition, the approach is not effective against rocking motion excitation, which is present in many/most applications.

SUMMARY OF INVENTION

Aspects and embodiments are directed to methods and apparatus for minimizing the vibration response of acoustic sensors to rocking excitation as would typically be experienced when the sensor is mounted to a vibrating structure (such as a moving vehicle). As discussed in more detail below, aspects and embodiments provide an approach to minimize the effects of local acceleration/vibration on the response of the acoustic sensor, and thereby improve performance in detecting acoustic signatures from short-duration events, such as gunshots, for example.

According to one embodiment, an acoustic sensing system includes an acoustic sensor configured to produce a sensor output signal representative of a response of the acoustic sensor to acoustic excitation and vibration excitation, at least one accelerometer configured to provide an acceleration signal responsive to the vibration excitation, and a controller, including an adaptive digital filter, coupled to the acoustic sensor and to the at least one accelerometer, and configured to receive the acceleration signal and to adjust coefficients of the adaptive digital filter so as to minimize coherence between a residual signal and the acceleration signal, the residual signal being a difference between the sensor output signal and a filter output signal from the adaptive digital filter.

In one example, the controller is configured to implement a least-mean-square algorithm to minimize a portion of the sensor output signal that is correlated with the acceleration signal, thereby minimizing the coherence. In another example, the acoustic sensor includes a sensing crystal and at least one compensation crystal. In one example, the sensing crystal and the at least one compensation crystal are connected together approximately 180 degrees out of phase with one another to provide at least partial cancellation of an axial component of the vibration excitation. The controller may be further configured to receive the residual signal. In one example, the at least one accelerometer is coupled to a housing of the acoustic sensor.

According to another embodiment, an acoustic sensing system includes an acoustic sensor including a sensing crystal and a compensation crystal, the sensing crystal providing a sense output signal in response to acoustic excitation and vibration excitation, and the compensation crystal providing a compensation output signal in response to the acoustic excitation and the vibration excitation, and a controller, including an adaptive digital filter, coupled to the acoustic sensor and configured to receive the compensation output signal and to adjust coefficients of the adaptive digital filter so as to minimize coherence between a residual signal and the compensation output signal, the residual signal being a difference between the sense output signal and a filter output signal from the adaptive digital filter.

In one example, the controller is configured to implement a least-mean-square algorithm to minimize a portion of the sense output signal that is correlated with the compensation output signal, thereby minimizing the coherence. In another example, the acoustic sensor further includes a tuning mass coupled to the sensing crystal and to the compensation crystal, the tuning mass being selected such that a response of the compensation crystal is dominated by the vibration excitation rather than the acoustic excitation. In another example, the compensation crystal comprises a compensation crystal stack including a plurality of compensation crystals coupled together.

Another embodiment is directed to a method of providing vibration cancelation in an acoustic sensing system. The method may include receiving a sensor output signal from an acoustic sensor, the sensor output signal being representative of a response of the acoustic sensor to acoustic excitation and vibration excitation, receiving at an input to an adaptive digital filter an acceleration signal from one or more accelerometers, the acceleration signal being responsive to the vibration excitation, producing a residual signal by taking a difference between the sensor output signal and a filter output signal from the adaptive digital filter, and adjusting coefficients of the adaptive digital filter so as to minimize coherence between the residual signal and the acceleration signal. The accelerometer(s) may be coupled to a housing of the acoustic sensor, or to a vibrating platform (e.g., the fuselage of an aircraft) on which the acoustic sensor is located.

In one example, adjusting the coefficients includes applying a least-mean-square algorithm to minimize a portion of the sensor output signal that is correlated with the acceleration signal, thereby minimizing the coherence between the residual signal and the acceleration signal.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 4A-D are graphs showing an example of the transfer functions (magnitude and phase) of forces applied to the sensing and compensation crystals of the sensor of FIGS. 1A and 1B for excitation of the face or housing of the sensor;

DETAILED DESCRIPTION

As discussed above, the vibration field experienced at locations where acoustic sensors are mounted (e.g., on moving vehicles) is typically comprised of both axial and rocking motion. However, conventional methods for compensating for the vibration response, while providing good performance against axial motion, are not effective against rocking motion. Accordingly, there is need for techniques to minimize the sensor response to rocking excitations, particularly for applications where the sensor is placed in locations subject to high levels of vibration. Aspects and embodiments provide approaches based on adaptive processing to improve vibration cancellation for acoustic sensors, accounting for both axial and rocking excitations. As discussed in more detail below, certain embodiments leverage and augment existing compensation techniques for minimizing the response to axial excitation to provide benefits against rocking and axial motion, while preserving and improving the desired acoustic sensing function.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1A:
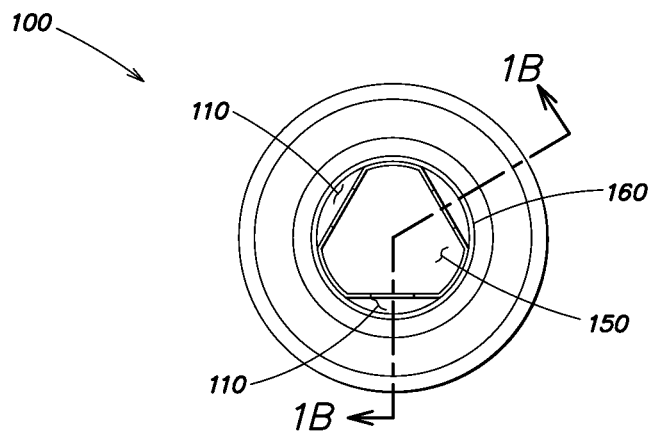
FIG. 1A is a plan view of one example of an acoustic sensor, as seen looking down on the sensor face, without the acoustic diaphragm and head mass.
Figure 1B:
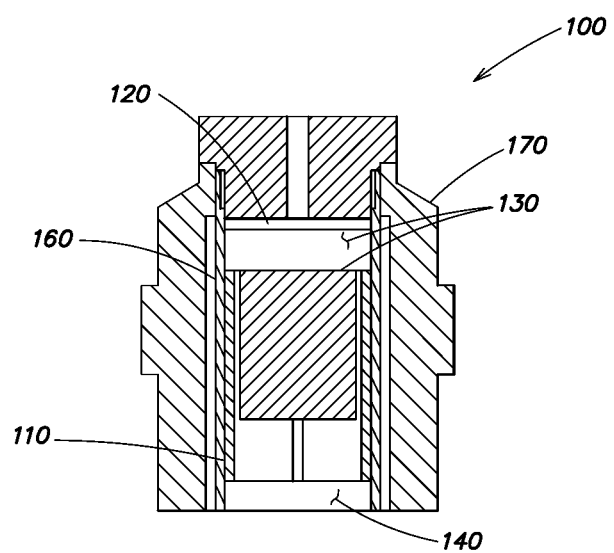
FIG. 1B is a cross-sectional view of the acoustic sensor of FIG. 1A taken along line A-A in FIG. 1A.

Referring to FIGS. 1A and 1B, there is illustrated one example of an acoustic sensor 100 to which the techniques according to various aspects and embodiments may be applied. The sensor 100 includes a sensing crystal 110, which in the illustrated example is made up of three crystal components (shown in FIG. 1A), and a compensation crystal 120. The crystals 110 and 120 are coupled to a mass and charge collector 130. The sensor further includes a head mass 140 (trimmed for balance), a triangular base 150, and a loading sleeve 160. The sensor components are mounted inside a housing 170.

Figure 2:
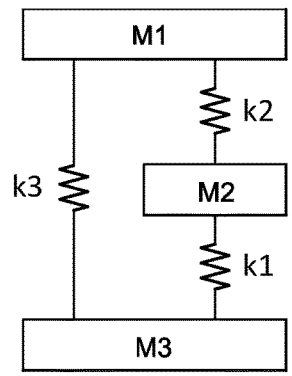
FIG. 2 is a schematic block diagram illustrating a model that may be used to represent the acoustic sensor of FIGS. 1A and 1B for the purposes of analysis of the acoustic and axial vibration responses, according to aspects of the invention.

FIG. 2 is a schematic block diagram illustrating a model that may be used to represent the acoustic sensor of FIGS. 1A and 1B for the purposes of analysis of the acoustic and vibration responses. In FIG. 2, k1 represents the sensing crystal 110, k3 represents the loading sleeve 160, and k2 represents the compensation crystal 120. M1 is a mass representing the housing 170. M2 is a tuning mass representing the mass and charge collector 130. M3 is mass representing the head mass 140 and associated acoustic diaphragm, etc. Movement of M3 compresses k1, producing an acoustic response from the sensing crystal. However, movement of M1 (e.g., due to vibration) causes a responsive movement in M3, which in turn compresses k1, because the two masses are coupled via k1 and k2, and to a lesser extent via k3, which may have very little stiffness. Thus, movement of M1 causes an acceleration response, not an acoustic response, from the sensing crystal. The two crystals represented by k1 and k2 may be coupled out of phase, or back to back, such that the acceleration response is cancelled, at least to some degree. As discussed above, in many, if not all, applications, it is desirable to substantially eliminate the acceleration response.

Figure 3:
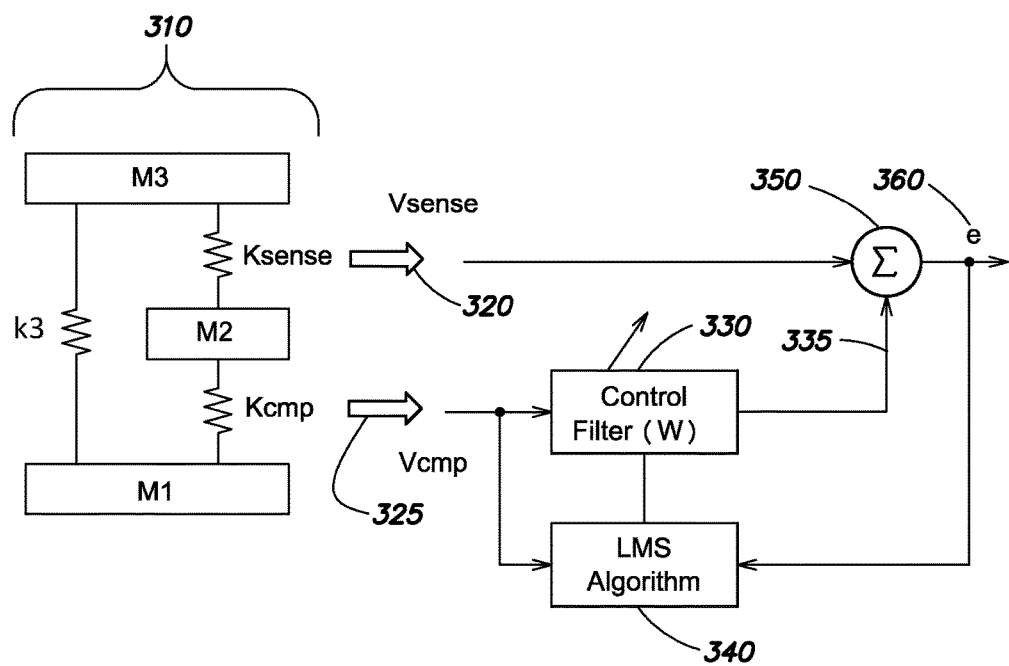
FIG. 3 is a block diagram of one example of an acoustic sensing system according to aspects of the present invention.

Aspects and embodiments are directed to methods of using adaptive processing to improve vibration/acceleration cancelation in acoustic sensors. Referring to FIG. 3, there is illustrated a schematic block diagram of one example of an acoustic sensing system incorporating adaptive processing for vibration cancelation according to certain embodiments. The acoustic sensor (e.g., a microphone) 310 is represented by the model of FIG. 2. The acoustic sensor 310 provides two output signals, namely, a sensing signal 320 and a compensation signal 325. In this embodiment, these signals are kept separate and provided as two distinct outputs signals. In the illustrated example, the output signals are voltages, $V_{sense}$ (sensing signal 320) and $V_{cmp}$ (compensation signal 325); however, those skilled in the art will readily appreciate that the signals may alternatively be currents rather than voltages. The system includes a controller comprised of a control filter 330 and an implementation of a least-mean-squares (LMS) algorithm module 340. The algorithm module 340 may be implemented in hardware and/or software, according to well known techniques in the art.

In this embodiment, the compensation signal 325 is used as a reference to remove the correlated part from the sensing signal 320. Accordingly, the compensation signal 325 is supplied to the controller, as shown in FIG. 3. The sensing signal 320, and the signal 335 output, w(n), from the control filter 330 are input to a summation/differencing block 350, the output of which is a "residual" signal (e) 360, which is the difference between the two inputs. In one example, the control filter 330 is an adaptive digital FIR filter, and may be described by the following equation:

$$w(n+1)=w(n)+\mu*Vcmp(n)*e(n) \quad (1)$$

In Equation (1), w(n) is a vector of digital coefficients at time step n, representing the response of the control filter 330. Thus, the response of the control filter 330 for the next sample or time step, w(n+1), is based on the response of the filter from the current sample/time point, w(n), an adaptation constant, μ, the compensation signal 325, and the residual signal, e(n). The LMS algorithm module 340 acts to adjust or adapt the control filter 330 so as to attempt to minimize the component of the residual signal, e, that is correlated with the compensation signal 325. As a result, the coherence between these two signals is reduced, and preferably minimized.

The stiffnesses of k1, k2, and k3, and the masses (M1, M2, and M3) may be tuned such that acceleration movement of M1 may cause a substantially equal compression in both k1 and k2. In a certain example, the stiffnesses and masses may be tuned such that, for axial acceleration of the housing 170, the compensation signal 325 is approximately equal to the sensing signal 320 ($V_{cmp} \sim V_{sense}$), and for acoustic excitation, the compensation signal is significantly smaller than the sensing signal (e.g., $V_{cmp} \sim V_{sense}-25$ dB). In certain cases, the controller may attempt to cancel the acoustic response of the sensor 310 if the compensation signal 325 produced in response to acoustic excitation is large relative to the compensation signal produced in response to vibration excitation. M2 may be tuned or chosen to attenuate the compensation signal 325 acoustic response relative to the sensing signal 320 acoustic response, and to increase the compensation signal response relative to the sensing signal response for vibration excitation, so to avoid this circumstance. Additionally, the adaptation constant, μ, may be used to avoid this circumstance in the case of rapid transients of interest, such as shockwave or muzzle blast signals, for example, for certain applications.

Figure 4C:
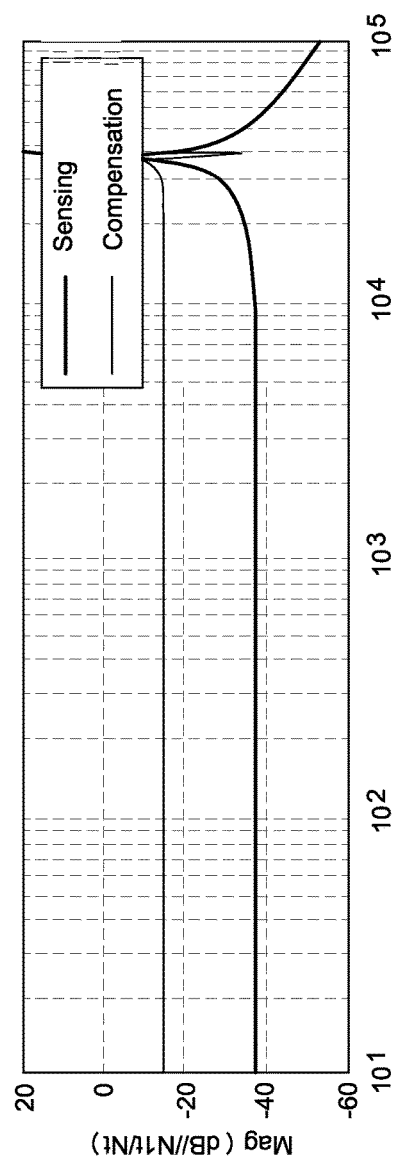
Figure 4D:
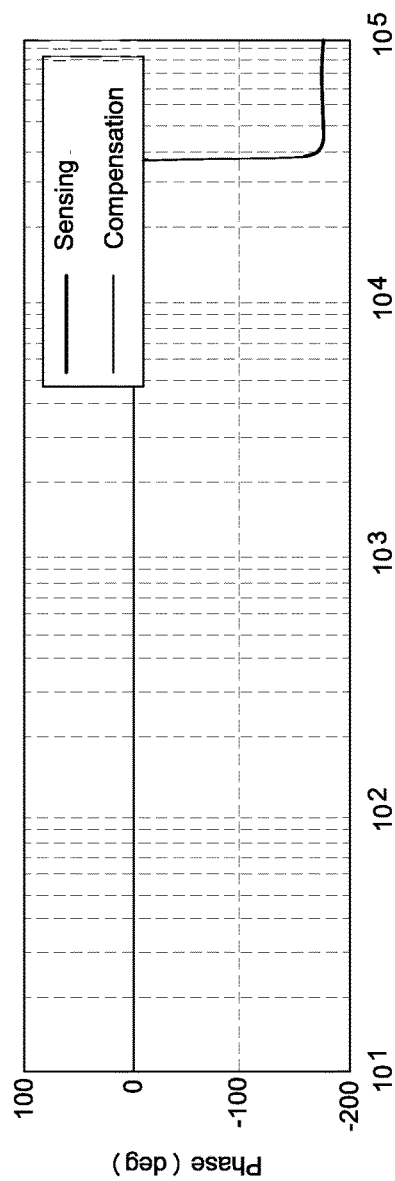

FIGS. 4A-D are graphs illustrating responses of the sensing and compensation crystals 110, 120 of the acoustic sensor to applied forces. FIGS. 4A and 4B illustrate an example of the transfer function (magnitude shown in FIG. 4A and phase shown in FIG. 4B) from force applied to the face of the acoustic sensor 310 to the force across the sensing crystal 110 (traces 410 and 430) and across the compensation crystal 120 (traces 420 and 440). That is, $F_{sense}/F_{face}$ and $F_{comp}/F_{face}$. FIGS. 4C and 4D illustrate an example of the transfer function of crystal forces normalized by a force applied to the sensor housing 170 (represented by M1). That is, $F_{sense}/F_{housing}$ and $F_{comp}/F_{housing}$. As shown, for a force on the face, the forces measured by both crystals 110, 120 is nearly the same (because M2 is selected to be very small relative to M1, and therefore there is little force drop due to F=MA across M2). On the contrary, for a force on the sensor housing 170, there is a large difference between the crystal forces. This is because M2 is large relative to M3, and therefore significant force is dropped across M2 for a force on the housing 170.

To achieve good vibration cancellation, the response signals (e.g., voltages) from both crystals 110, 120 should cancel each other out for a force on, or acceleration of, the housing 170. As may be seen with reference to FIGS. 4C and 4D, this condition may be achieved by selecting a compensation crystal 120 with a sensitivity (Volts/Nt) of approximately 20 dB less than that of the sensing crystal 110. With this selection, the response signals from both crystals may be approximately equal, and will therefore effectively cancel for housing acceleration. As may be seen with reference to FIGS. 4A and 4B, and assuming the same relative sensitivity that provides good vibration cancellation, the response signal from the compensation crystal 120 for a force (or pressure) on the face is approximately 20 dB lower than the response signal from the sensing crystal 110. As such, the acoustic response from the acoustic sensor 310, even with vibration cancellation, may be dominated by the response signal from the sensing crystal, as desired.

In certain applications and/or implementations, there may be some disadvantages associated with the embodiment of FIG. 3. For example, in some cases it may be difficult to separate the two output signals, $V_{cmp}$ and $V_{sense}$, from the acoustic sensor 310. Additionally, in certain implementations, the geometry of the compensation crystal 120 may reject rocking vibration more successfully than does the acoustic sensing crystal 110, which is not desirable. Accordingly, other embodiments may address these potential drawbacks, and leverage existing axial vibration compensation methods that are implemented in certain state-of-the-art commercially available acoustic sensors.

Figure 5:
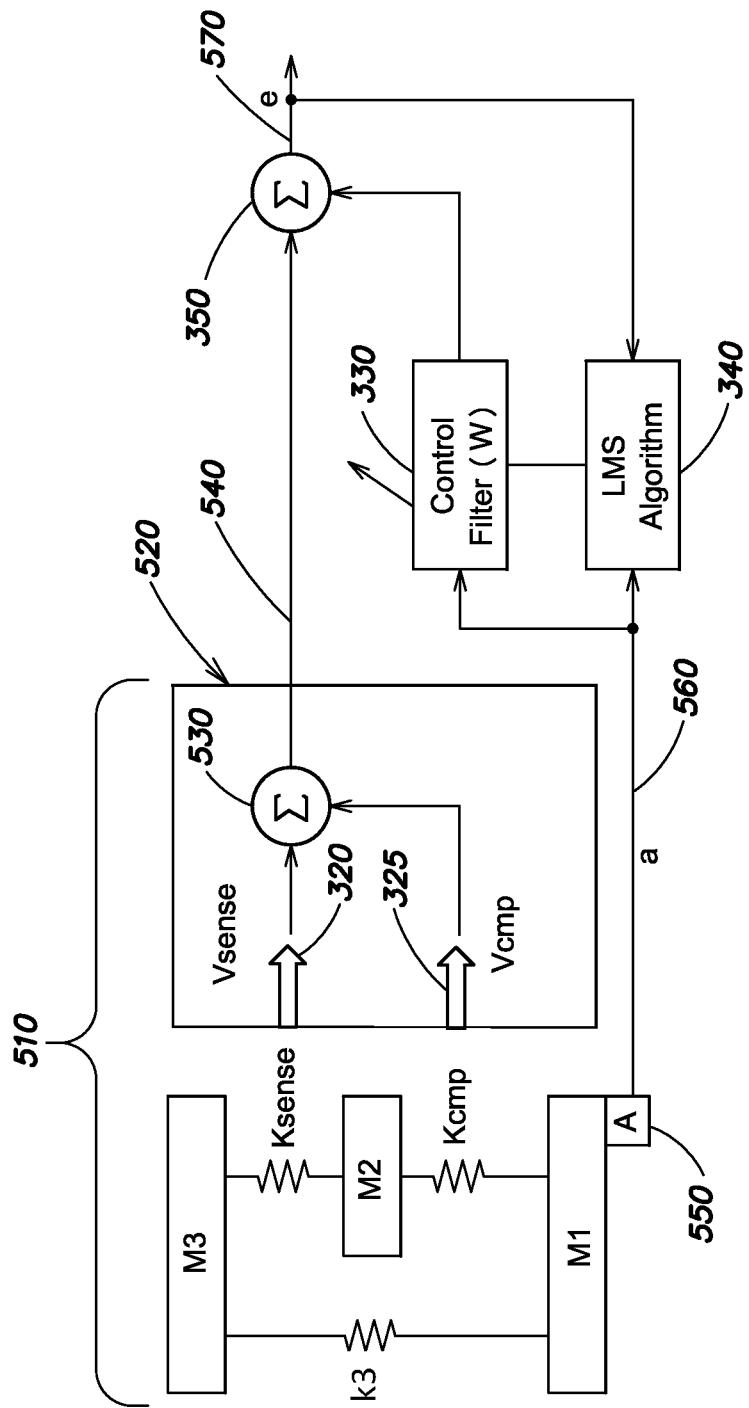
FIG. 5 is a block diagram of another example of an acoustic sensing system according to aspects of the present invention.

Referring to FIG. 5, there is illustrated a block diagram of another example of an acoustic sensing system incorporating adaptive processing according to certain embodiments. In this example, the acoustic sensor 510 includes an internal vibration cancellation block 520. As discussed above, this internal cancellation 520 may be primarily effective against axial motion. The signals from the sensing crystal and the compensation crystal, $V_{cmp}$ and $V_{sense}$, are internally differenced (represented by summation/differencing block 530), such that a single sensor output signal 540 is supplied. Thus, this approach avoids the need to capture the sensing and compensation signals 320, 325 as separate output signals from the acoustic sensor. An accelerometer 550 measures movement (rocking and axial) of the sensor and outputs an acceleration signal 560 in response to the measured movement. The accelerometer 550 may be coupled to, for example, mounted to, the housing of the acoustic sensor 510 (represented by M1, as discussed above), or disposed on a vibrating platform (e.g., the fuselage or an aircraft or other structure) on which the acoustic sensor is also disposed. The acceleration signal 560 is dominated by vibration excitations, rather than acoustic vibrations. The accelerometer 550 thus supplies a reference signal that is well correlated with the local acceleration response of the acoustic sensor 510, and may used to remove the residual vibration response (e.g., from rocking excitations) from the output signal 540 from the acoustic sensor 510. The acceleration signal 560 is supplied as an input to the controller (330 and 340). The output from the control filter 330 is input, along with the output signal 540 from the acoustic sensor 510, to a summation/differencing block 350, the output of which is the residual signal 570(e), which is the difference between the two inputs, as discussed above. The residual signal 570, is also input to the controller, and the LMS algorithm module 340 acts to adapt the control filter 330 to minimize the component of the residual signal that is correlated with the acceleration signal 560(a). As a result, the coherence between these two signals is reduced, and preferably minimized, similar to the situation discussed above. In one example, the control filter 330 is a digital FIR filter described by Equation (1), as discussed above, and the LMS algorithm module acts to adjust the digital filter coefficients to achieve the minimization.

Figure 6:
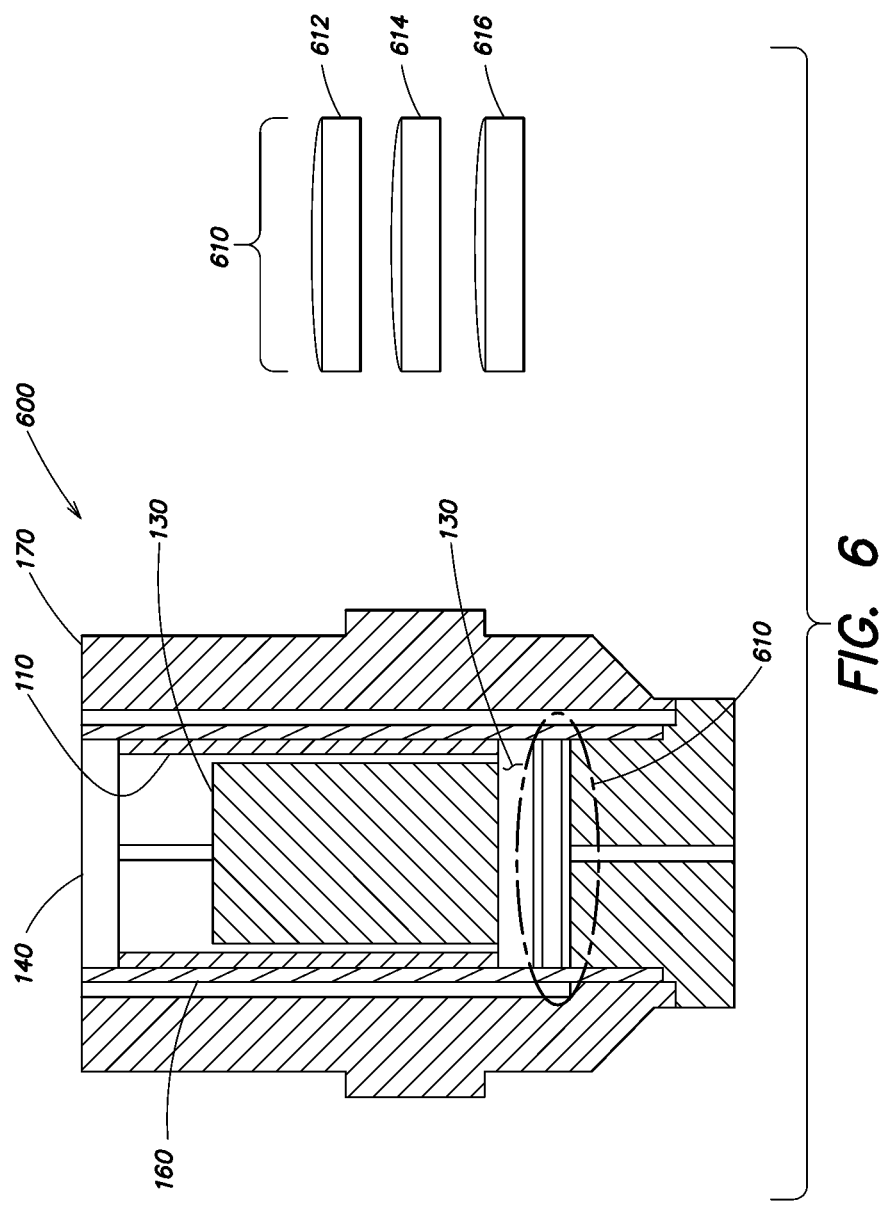
FIG. 6 is a cross-sectional view and diagrammatic representation of one example of an acoustic sensor including additional cancelation/compensation crystals, according to aspects of the present invention.
Figure 7:
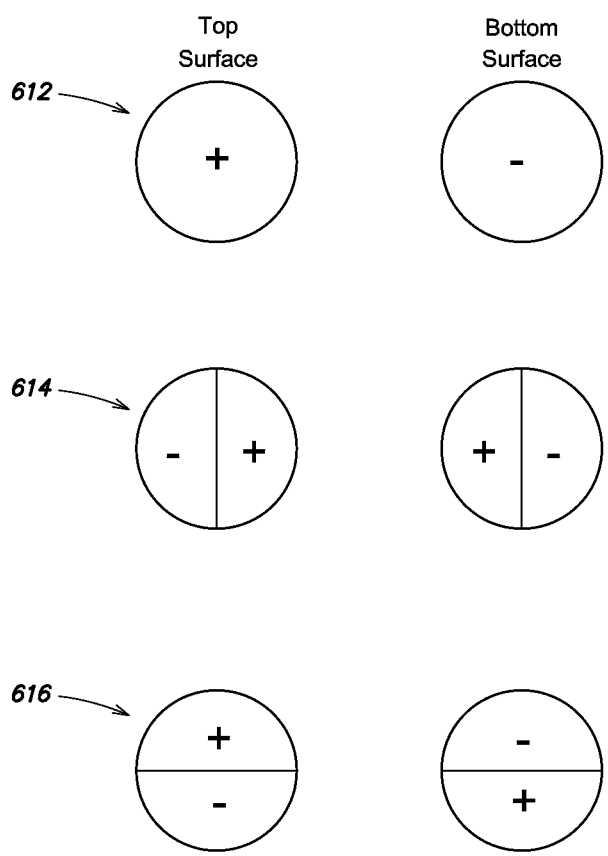
FIG. 7 is a diagram illustrating an example of the polarity of the compensation crystal stack of FIG. 6, according to aspects of the present invention.

According to another embodiment, the acoustic sensor may be modified to include multiple compensation crystals. For example, referring to FIG. 6, there is illustrated an example of an acoustic sensor 600 in which the single compensation crystal 120 of the example of FIGS. 1A-B is replaced with a compensation crystal stack 610. In the illustrated example, the compensation crystal stack includes three crystals 612, 614, and 616 arranged vertically on top of one another; however, it is to be appreciated that other embodiments may include a different number of crystals and/or that the crystals may be arranged differently. The additional compensation crystals may be used to preferentially sense rocking motion of the acoustic sensor 600. FIG. 7 illustrates one example of a polarity configuration for the three-crystal compensation crystal stack 610. In this example, the top crystal 612 has a top surface with positive polarity and a bottom surface with negative polarity. The middle and lower crystals 614 and 616 each have top and bottom surfaces that are split into two polarities, as shown in FIG. 7. With this arrangement, the response of the crystals 614 and 616 is split into two axes. Those skilled in the art will appreciate, given the benefit of this disclosure, that numerous other polarity configurations may be implemented, and embodiments are not limited to the example illustrated in FIG. 7. Embodiments of the acoustic sensor 600 may be combined with the adaptive processing techniques discussed above with reference to FIG. 5, for example. In such implementations, the benefits of existing internal vibration cancelation available in certain conventional acoustic sensors (as discussed above) may be leveraged, and combined with the benefits of both the above-discussed adaptive processing and the use of multiple compensation crystals.

Thus, aspects and embodiments may provide techniques for reducing the vibration sensitivity of an acoustic sensor to both axial and rocking excitations. Certain embodiments, discussed above with reference to FIG. 3, may include selecting M2 so as to separate the dominant responses in the sensing crystal 110 and compensation crystal 120, wherein the compensation crystal responds to both axial and rocking excitations. Certain embodiments, discussed above with reference to FIG. 5, may include the use of one or more accelerometers 550 to provide a reference signal representative of both axial and rocking excitations. Additional embodiments, discussed above with reference to FIGS. 6 and 7, include the use of multiple compensation crystals to extend vibration cancellation techniques to multiple axes. Local adaptive processing is used to remove the vibration response (axial and rocking) from the acoustic sensor output signal(s), as discussed above. The local adaptive processing may advantageously involve the use of minimal processing power and memory (implementation of well known FIR digital filters and LMS algorithms), and are easily compatible with sensor packaging to provide "smart" acoustic sensors (with built-in enhanced vibration cancelation).

Simulation Examples

The function and advantages of these and other embodiments will be more fully understood from the following examples. The examples are intended to be illustrative in nature and are not to be considered as limiting the scope of the systems and methods discussed herein.

Simulation Set-up

Figure 8A:
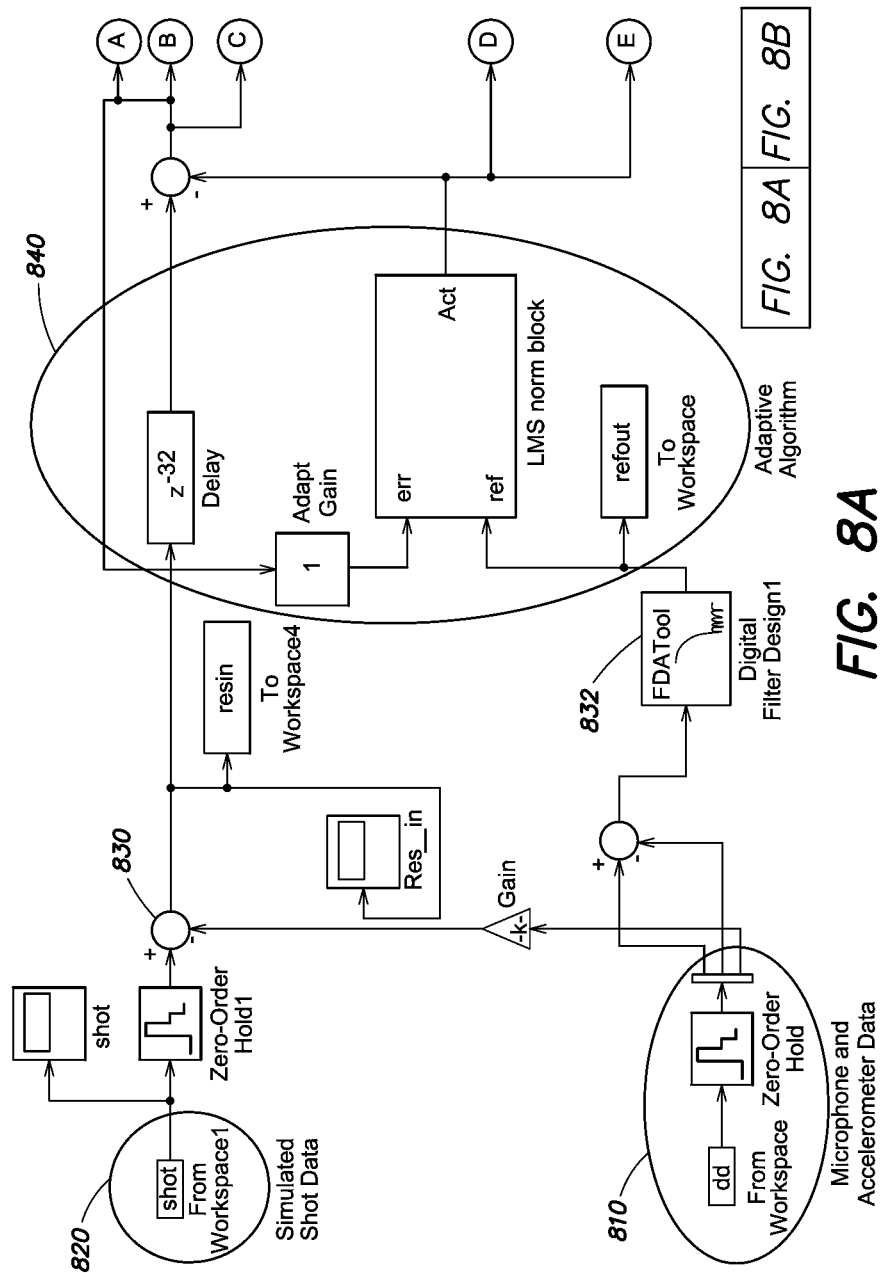
FIGS. 8A and 8B together are a diagram of a time-domain MATLAB Simulink model used to simulate the response of an example of the system of FIG. 5 to acoustic and vibration excitations.
Figure 8B:
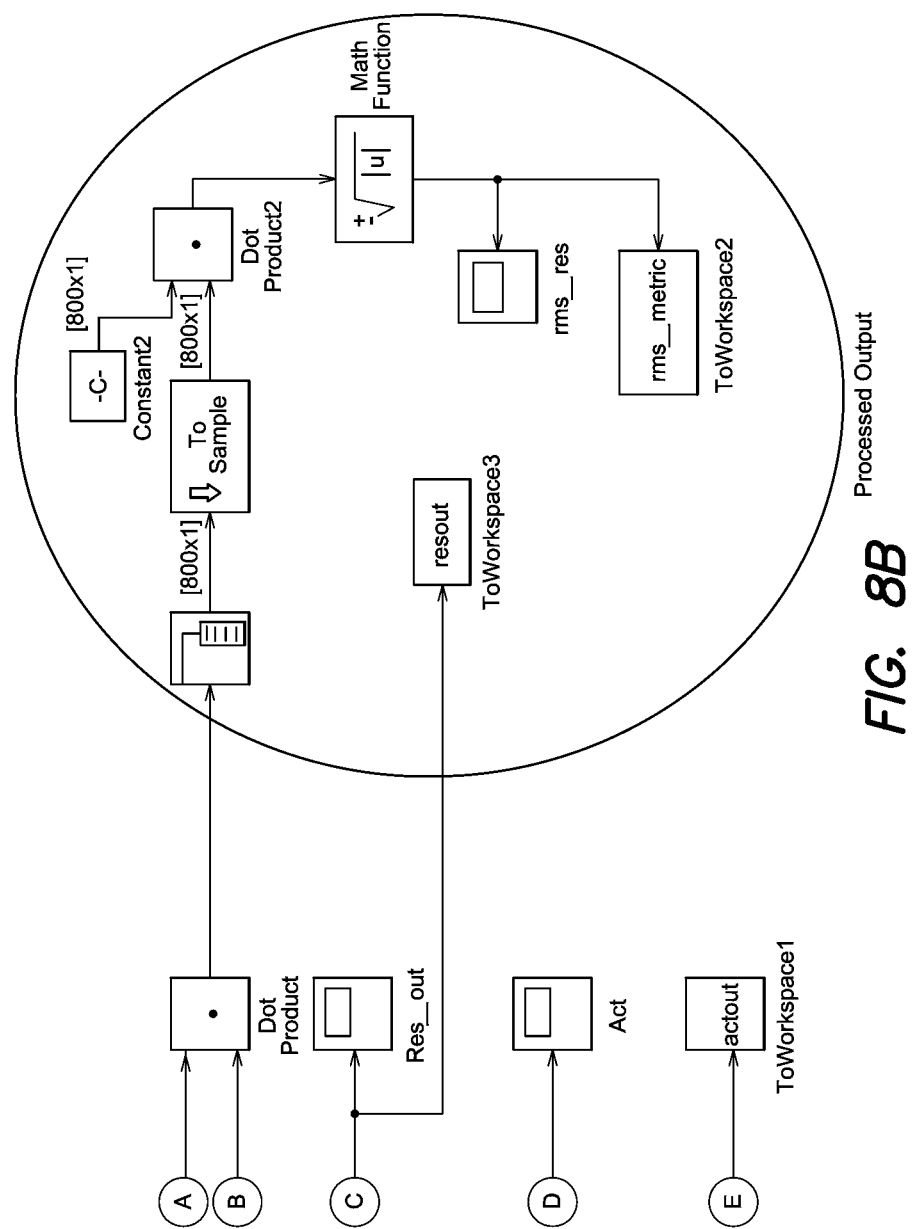

Simulations were performed to demonstrate the use of a local acceleration response and adaptive processing to improve the vibration sensitivity of an acoustic sensor. A time-domain MATLAB Simulink model of the system of FIG. 5 was implemented for the simulation. The model is illustrated in FIG. 8A. Inputs to the model include measured microphone and accelerometer data 810, obtained as discussed below, and simulated shot data 820 (representing a short, transient acoustic event of interest).

Figure 8C:
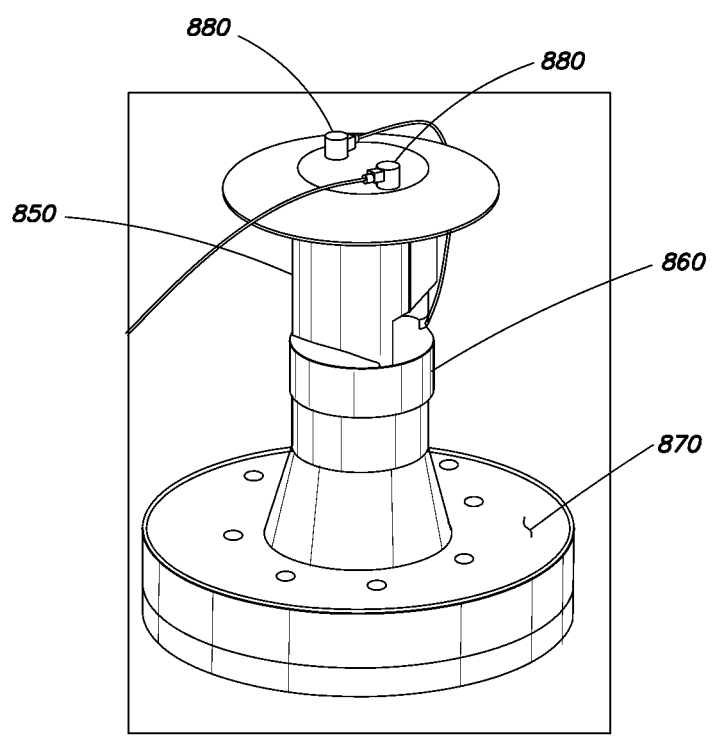
FIG. 8C is an illustration of the acoustic sensor and excitation platform used to produce data used in the simulation model of FIGS. 8A and 8B.

The measured microphone data was obtained using an example of the microphone shown in FIGS. 1A and 1B contained within a custom housing suitable for mounting the assembly into the fuselage of an aircraft or helicopter. Referring to FIG. 8C, the housing 850 was mounted via a baseplate 860 to an electromagnetic shaker 870 that was used to provide vibration excitation. Two accelerometers 880 were mounted to the housing (approximately 180 degrees apart), and the acceleration signals (signal A1 from one accelerometer and signal A2 from the other accelerometer) were recorded to allow simple beamforming to both axial and rocking motions. The data from the shaker testing provided a measured sensor response to vibration excitation.

Figure 9:
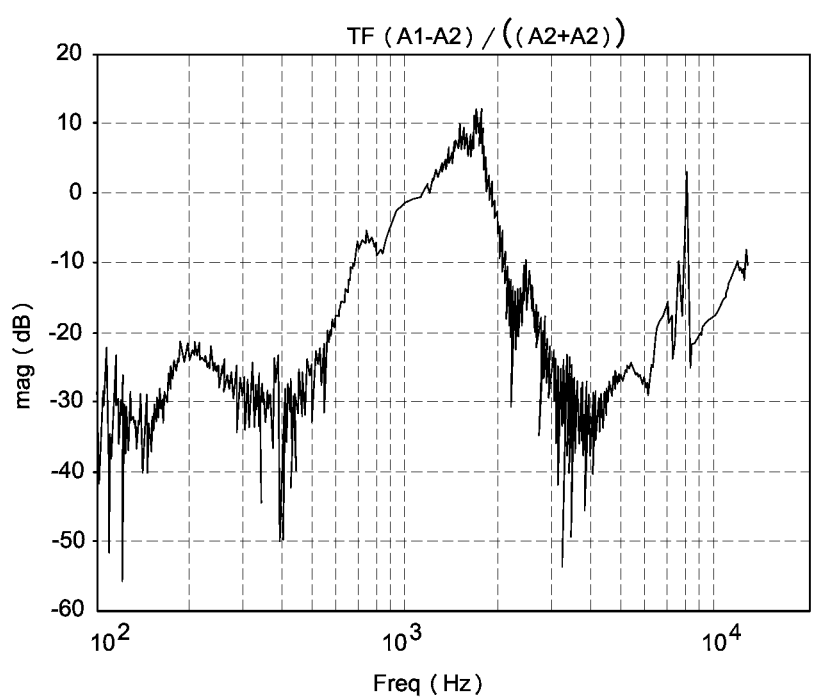
FIG. 9 is a graph of the transfer function between rocking and axial acceleration responses for vibration excitation used in the simulation model of FIGS. 8A-B.

The transfer function for the rocking response of the microphone (A1-A2) divided by the axial response of the microphone (A1+A2) is shown in FIG. 9. As may be seen with reference to FIG. 9, the rocking response dominates the axial response in the frequency band of about 1-2 kHz.

Figure 10:
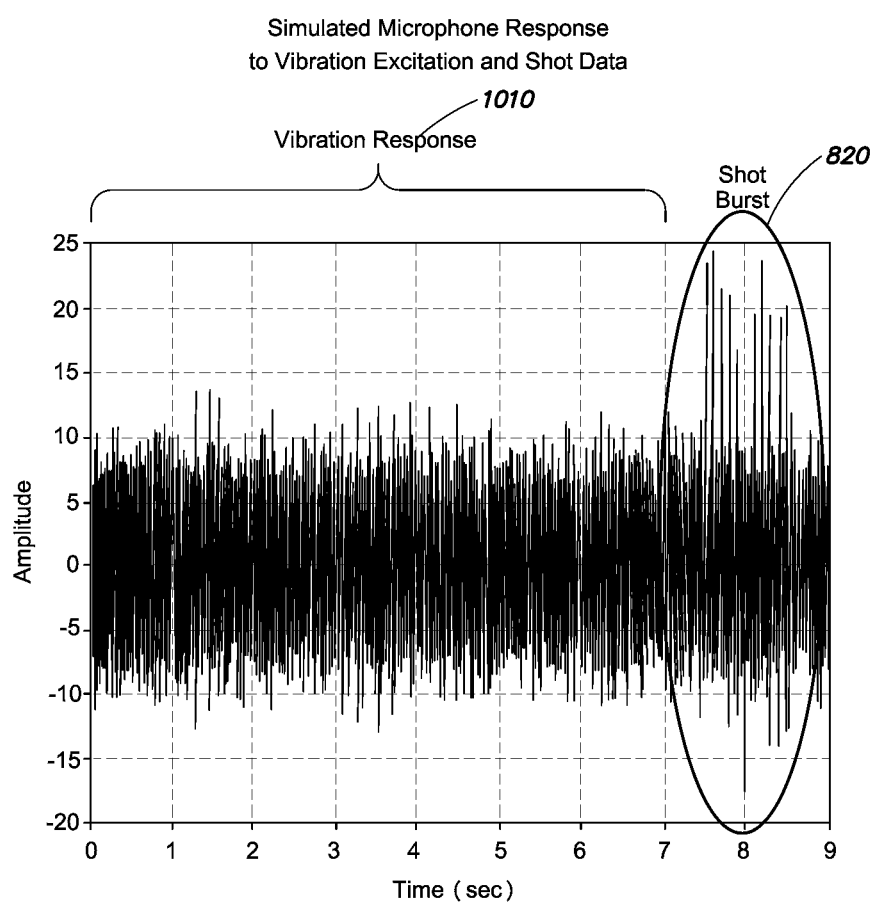
FIG. 10 is a graph of the simulated microphone response to vibration excitation and simulated shot burst data used in the simulation model of FIGS. 8A-B.

The simulated shot data is summed with the measured microphone and accelerometer data 810, as shown at summation block 830 in FIG. 8A. The resulting simulated microphone response, including both vibration and acoustic shot responses, is shown in FIG. 10. The response to the vibration input (vibration response 1010) is directly from the collected measured data 810, to which is added the simulated shot burst 820 starting at time 7.5 seconds.

Figure 11:
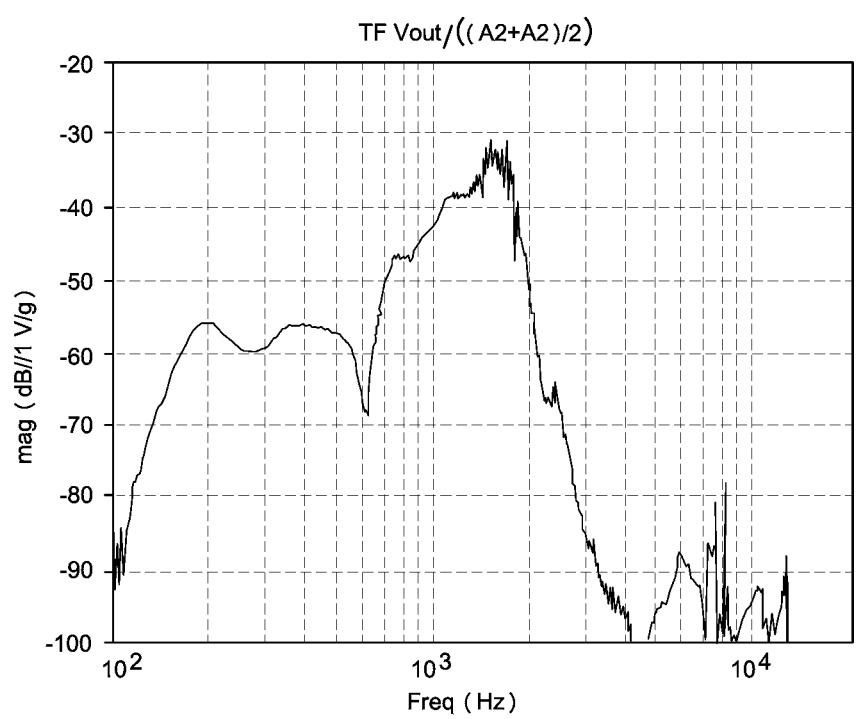
FIG. 11 is a graph of the transfer function of the microphone output signal (voltage) divided by the average axial acceleration of the microphone housing, used in the simulation model of FIGS. 8A-B.

The transfer function of the microphone output divided by average axial acceleration is shown in FIG. 11. As may be seen with reference to FIG. 11, the low-frequency response is nominally flat at about 1 mV/g (−60 dB//1V/g). The roll-off at higher frequency is the result of passive isolation of the microphone from the housing. The peak between 770 Hz and 2 kHz is the result of rocking excitation, which is not effectively cancelled by the microphone's compensation crystal.

Simulation Results

The model of FIG. 8A was run using the microphone response of FIG. 10 and using the rocking acceleration response (A1-A2) as the reference signal 560. The reference signal was low-pass filtered, represented at block 832, to focus the performance in a frequency band of interest. The adaptive filter, represented in the model at 840, converged quickly to reduce the response in the microphone signal that was correlated with the reference signal in the band of interest. The open-loop microphone response (without adaptive control) is shown as trace 1210 in FIG. 12A. The closed-loop microphone response (with adaptive control starting at 1.0 sec) is shown as trace 1220. The effect of the adaptive algorithm is evident in that the vibration-induced response is suppressed to a lower level after time 1.0. Additionally, the simulated shot burst response 820 is well preserved, as desired.

Figure 12A:
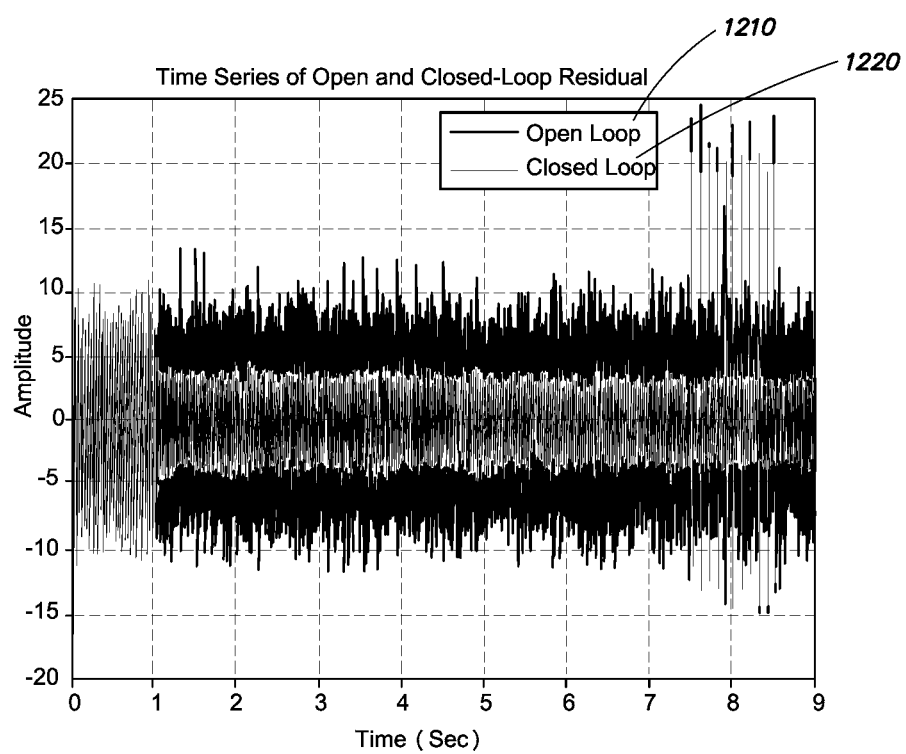
FIG. 12A is a graph showing simulated open-loop (without adaptive filtering) and closed-loop (with adaptive filtering) microphone output signals obtained by running the model of FIGS. 8A-B.
Figure 12B:
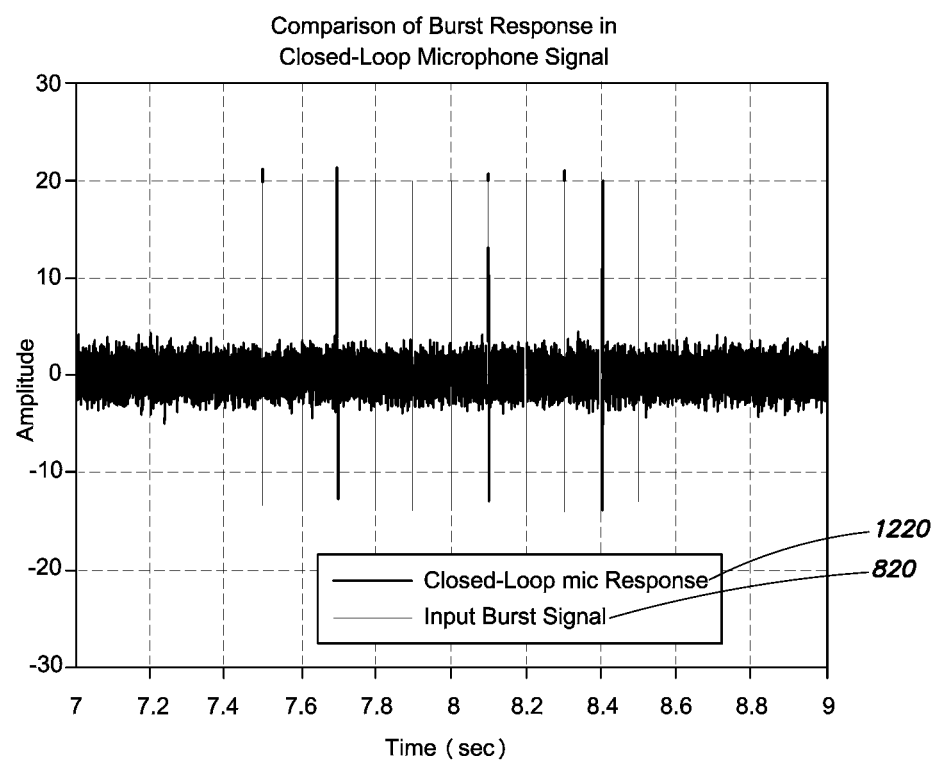
FIG. 12B is an expanded view of a portion of FIG. 12A.

FIG. 12B illustrates an expanded view of a portion of the responses shown in FIG. 12A. Preservation of the simulated shot burst response is more clearly seen in FIG. 12B by comparing the simulated burst waveform 820 to the closed-loop microphone response 1220 throughout the burst.

Figure 13:
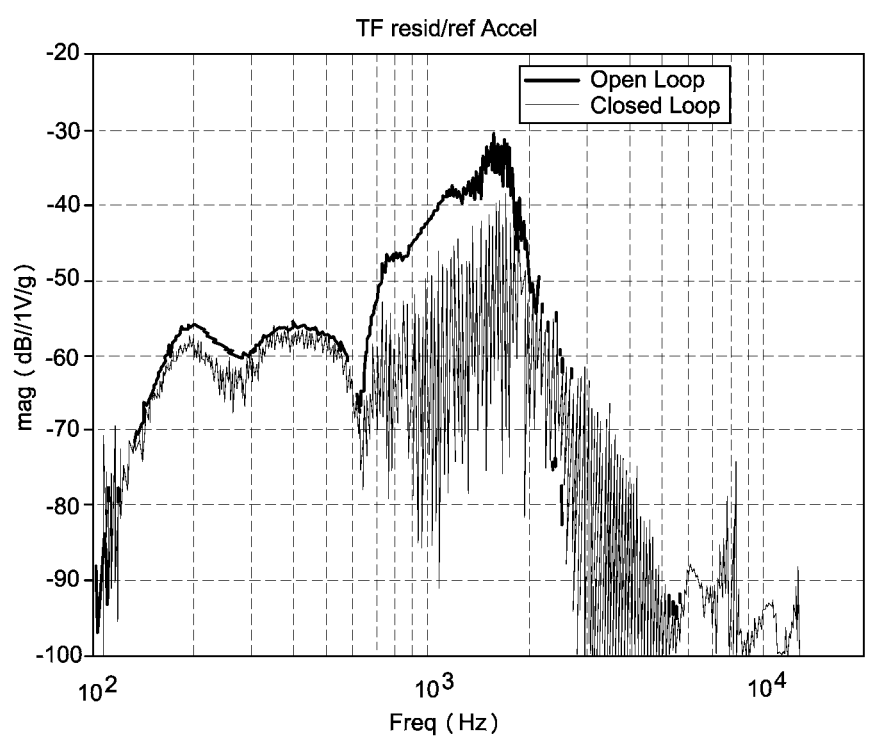
FIG. 13 is a graph showing the simulated open-loop (without adaptive filtering) and closed-loop (with adaptive filtering) transfer functions between the simulated microphone response and the applied axial acceleration.
Figure 14:
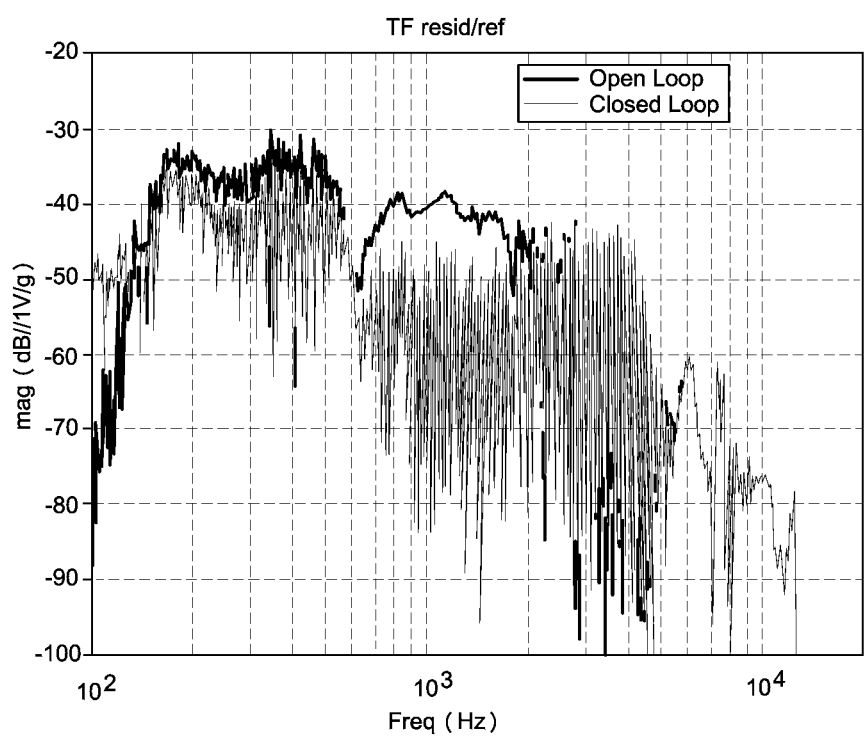
FIG. 14 is a graph showing the simulated open-loop (without adaptive filtering) and closed-loop (with adaptive filtering) transfer functions between the simulated microphone response and the applied rocking acceleration.

In addition to the results shown in FIGS. 12A and 12B, the effectiveness of the adaptive processing approach may be seen by comparing the open- and closed-loop transfer functions between the microphone output and the axial acceleration. This comparison is shown in FIG. 13. The corresponding transfer-function comparison between the microphone response and rocking acceleration (A1-A2) is shown in FIG. 14. As desired, the closed-loop response is suppressed in the frequency region that was dominated by rocking response.

Figure 15:
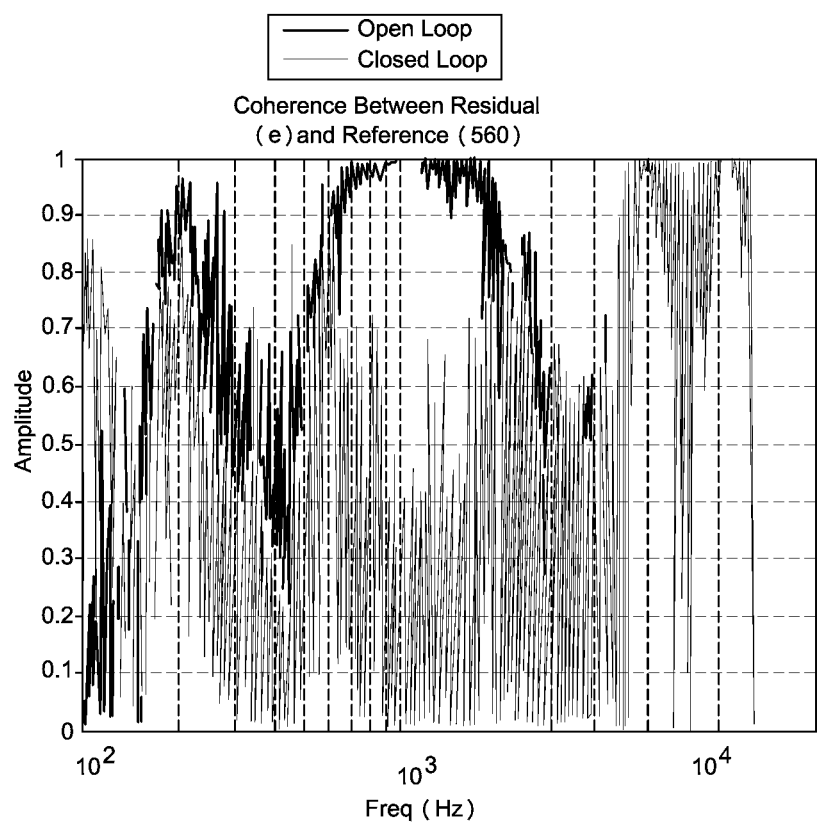
FIG. 15 is a graph showing the simulated open-loop (without adaptive filtering) and closed-loop (with adaptive filtering) coherence between the simulated microphone response and the applied rocking excitation.

FIG. 14 clearly shows that the adaptive filter has suppressed the response in the microphone signal correlated with the rocking motion as characterized by A1-A2. The degree to which the correlated portion has been suppressed may be seen by comparing the coherence estimate between the microphone response and rocking acceleration before and after adaptive control. This comparison is shown in FIG. 15. The coherence is high between the rocking motion and the microphone response in the absence of adaptive control in the frequency region from ~700 Hz to 2 kHz. When adaptive control is applied (closed-loop), the coherence in this frequency region drops significantly, indicating that the portion of the microphone response that was correlated with the rocking motion has been significantly reduced.

Thus, the simulations demonstrate the effectiveness of using adaptive filter control to minimize the vibration response of a microphone to rocking and axial motion, while preserving the response to the acoustic excitation of interest (e.g., a gun-shot signature). The simulations showed that using adaptive processing successfully reduced the microphone response to the rocking excitation, as desired, and thereby may provide an enhancement over conventional vibration cancellation techniques which are generally effective only against axial excitation, as discussed above. The simulations discussed above use the combination of the two accelerometers 880 as a single reference sensor; however, the two accelerometers may be used independently in other examples. The techniques discussed herein may be extended to use multiple reference signals, as will be appreciated by those skilled in the art, which may be advantageous in certain applications.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An acoustic sensing system comprising:
   an acoustic sensor configured to produce a sensor output signal representative of a response of the acoustic sensor to acoustic excitation and a rocking vibration excitation, the rocking vibration excitation being about an axis perpendicular to an acoustic sensing axis of the acoustic sensor, wherein the rocking vibration excitation is based on movement of a housing of the acoustic sensor,
   wherein the acoustic sensor includes a sensing crystal and a plurality of compensation crystals coupled together, the plurality of compensation crystals including:
      a top compensation crystal having a first top surface with a first polarity and a first bottom surface with a second polarity,
      a lower compensation crystal having a second top surface and a second bottom surface, each of the second top surface and the second bottom surface being split between a first portion thereof having the first polarity and a second portion thereof having the second polarity, and
      a middle compensation crystal interposed between the top compensation crystal and the lower compensation crystal, the middle compensation crystal having a third top surface and a third bottom surface, each of the third top surface and the third bottom surface being split between a third portion thereof having the first polarity and a fourth portion thereof having the second polarity;
   at least one accelerometer mounted to the housing of the acoustic sensor and configured to measure the movement of the housing and to provide an acceleration signal responsive to the rocking vibration excitation; and
   a controller, including an adaptive digital filter, coupled to the acoustic sensor and to the at least one accelerometer, and configured to receive the acceleration signal and to adjust coefficients of the adaptive digital filter so as to minimize coherence between a residual signal and the acceleration signal and thereby minimize a portion of the residual signal that is correlated with the rocking vibration excitation, the residual signal being a difference between the sensor output signal and a filter output signal from the adaptive digital filter, the controller being configured to output the residual signal as a vibration compensated output.

2. The acoustic sensing system of claim 1 wherein the controller is configured to implement a least-mean-square algorithm to minimize the portion of the residual signal that is correlated with the rocking vibration excitation, thereby minimizing the coherence.

3. The acoustic sensing system of claim 1, wherein the sensor output signal is further representative of a response of the acoustic sensor to an axial vibration excitation, and the sensing crystal and the plurality of compensation crystals are connected together to provide at least partial cancellation of the axial vibration excitation.

4. The acoustic sensing system of claim 1 wherein the controller is further configured to receive the residual signal.

5. An acoustic sensing system comprising:
an acoustic sensor including a sensing crystal and a compensation crystal stack each mounted inside a housing of the acoustic sensor, the sensing crystal providing a sense output signal in response to an acoustic excitation and a rocking vibration excitation, the rocking vibration excitation being about an axis perpendicular to an acoustic sensing axis of the acoustic sensor, and the compensation crystal stack providing a compensation output signal in response to the acoustic excitation and the rocking vibration excitation, wherein the rocking vibration excitation is based on movement of the housing,
wherein the compensation crystal stack includes a plurality of compensation crystals coupled together, the plurality of compensation crystals including:
a top compensation crystal having a first top surface with a first polarity and a first bottom surface with a second polarity,
a lower compensation crystal having a second top surface and a second bottom surface, each of the second top surface and the second bottom surface being split between a first portion thereof having the first polarity and a second portion thereof having the second polarity, and
a middle compensation crystal interposed between the top compensation crystal and the lower compensation crystal, the middle compensation crystal having a third top surface and a third bottom surface, each of the third top surface and the third bottom surface being split between a third portion thereof having the first polarity and a fourth portion thereof having the second polarity; and
a controller, including an adaptive digital filter, coupled to the acoustic sensor and configured to receive the compensation output signal and to adjust coefficients of the adaptive digital filter so as to minimize coherence between a residual signal and the compensation output signal and thereby minimize a portion of the residual signal that is correlated with the rocking vibration excitation, the residual signal being a difference between the sense output signal and a filter output signal from the adaptive digital filter, the controller being configured to output the residual signal as a vibration compensated output.

6. The acoustic sensing system of claim 5 wherein the controller is configured to implement a least-mean-square algorithm to minimize the portion of the residual signal that is correlated with the rocking vibration excitation, thereby minimizing the coherence.

7. The acoustic sensing system of claim 5 wherein the acoustic sensor further includes a tuning mass coupled to the sensing crystal and to the compensation crystal stack, the tuning mass being selected such that a response of the compensation crystal stack is dominated by an axial vibration excitation rather than the acoustic excitation.

8. A method of providing vibration cancelation in an acoustic sensing system, the method comprising:
providing an acoustic sensor including a sensing crystal and a plurality of compensation crystals coupled together, the plurality of compensation crystals including:
a top compensation crystal having a first top surface with a first polarity and a first bottom surface with a second polarity,
a lower compensation crystal having a second top surface and a second bottom surface, each of the second top surface and the second bottom surface being split between a first portion thereof having the first polarity and a second portion thereof having the second polarity, and
a middle compensation crystal interposed between the top compensation crystal and the lower compensation crystal, the middle compensation crystal having a third top surface and a third bottom surface, each of the third top surface and the third bottom surface being split between a third portion thereof having the first polarity and a fourth portion thereof having the second polarity;
receiving a sensor output signal from the acoustic sensor, the sensor output signal being representative of a response of the acoustic sensor to acoustic excitation and a rocking vibration excitation, the rocking vibration excitation being about an axis perpendicular to an acoustic sensing axis of the acoustic sensor, wherein the rocking vibration excitation is based on movement of a housing of the acoustic sensor;
receiving, at an input to an adaptive digital filter, an acceleration signal from at least one accelerometer mounted to the housing of the acoustic sensor, the acceleration signal being responsive to the rocking vibration excitation;
producing a residual signal as a vibration compensated output by taking a difference between the sensor output signal and a filter output signal from the adaptive digital filter; and
adjusting coefficients of the adaptive digital filter so as to minimize coherence between the residual signal and the acceleration signal and thereby minimize a portion of the residual signal that is correlated with the rocking vibration excitation.

9. The method of claim 8 wherein adjusting the coefficients includes applying a least-mean-square algorithm to minimize the portion of the residual signal that is correlated with the rocking vibration excitation, thereby minimizing the coherence between the residual signal and the acceleration signal.

10. The acoustic sensing system of claim 5, wherein the first polarity is a positive polarity and the second polarity is a negative polarity.

11. The acoustic sensing system of claim 1, wherein the first polarity is a positive polarity and the second polarity is a negative polarity.

* * * * *